(12) United States Patent
Lunsford et al.

(10) Patent No.: US 7,092,671 B2
(45) Date of Patent: Aug. 15, 2006

(54) METHOD AND SYSTEM FOR WIRELESSLY AUTODIALING A TELEPHONE NUMBER FROM A RECORD STORED ON A PERSONAL INFORMATION DEVICE

(75) Inventors: E. Michael Lunsford, San Carlos, CA (US); Steve Parker, Centerville, UT (US); David Kammer, Seattle, WA (US); David Moore, Riverton, UT (US)

(73) Assignee: 3Com Corporation, Marlborough, MA (US)

( * ) Notice: Subject to any disclaimer, the term of this patent is extended or adjusted under 35 U.S.C. 154(b) by 615 days.

(21) Appl. No.: 09/727,727

(22) Filed: Nov. 30, 2000

(65) Prior Publication Data

US 2002/0065041 A1 May 30, 2002

(51) Int. Cl.
*H04B 7/00* (2006.01)
(52) U.S. Cl. .................. 455/41.2; 455/412.1; 455/418; 455/419; 455/414.3; 455/466; 455/565; 455/557; 455/563; 455/410; 455/411
(58) Field of Classification Search .................. 455/41, 455/411, 418, 41.2, 41.3, 412.1, 419, 414.3, 455/557, 563
See application file for complete search history.

(56) References Cited

U.S. PATENT DOCUMENTS

| | | | | |
|---|---|---|---|---|
| 5,109,403 | A | * | 4/1992 | Sutphin ...................... 455/419 |
| 5,655,219 | A | * | 8/1997 | Jusa et al. ................... 455/338 |
| 5,878,339 | A | * | 3/1999 | Zicker et al. ................ 455/419 |
| 5,961,600 | A | * | 10/1999 | Ono et al. ................... 709/228 |
| 5,983,100 | A | * | 11/1999 | Johansson et al. ........ 455/426.1 |
| 6,069,588 | A | * | 5/2000 | O'Neill, Jr. .................. 343/713 |
| 6,122,523 | A | * | 9/2000 | Zicker et al. ................ 455/551 |
| 6,282,433 | B1 | * | 8/2001 | Holshouser ............... 455/556.2 |
| 6,331,972 | B1 | * | 12/2001 | Harris et al. ................. 370/313 |
| 6,374,079 | B1 | * | 4/2002 | Hsu .......................... 455/11.1 |
| 6,424,820 | B1 | * | 7/2002 | Burdick et al. ............. 455/41.1 |
| 6,484,027 | B1 | * | 11/2002 | Mauney et al. .............. 455/421 |
| 6,515,575 | B1 | * | 2/2003 | Kataoka ...................... 340/5.8 |
| 6,577,877 | B1 | * | 6/2003 | Charlier et al. ............. 455/557 |
| 6,584,080 | B1 | * | 6/2003 | Ganz et al. .................. 370/315 |
| 6,600,902 | B1 | * | 7/2003 | Bell ........................... 455/411 |
| 6,650,871 | B1 | * | 11/2003 | Cannon et al. ............. 455/41.2 |
| 6,728,531 | B1 | * | 4/2004 | Lee et al. .................... 455/419 |

* cited by examiner

*Primary Examiner*—Marceau Milord

(57) ABSTRACT

An automated telephone dialing system. The system enables a handheld PID to automatically dial a telephone number stored its memory by interacting with a telephone. The telephone is equipped with a wireless port for short-range wireless data transfer. Similarly, the PID is equipped with a wireless port for short-range wireless data transfer. The PID establishes a wireless communication with the telephone. The PID is configured to control the telephone via the wireless communications such that the telephone dials a telephone number stored on the PID. The telephone number can be dialed in response to the user interacting with application executing on the PID. The application can be a contact management or address management program. The user can interact with the program, select a contact, address, phone number, or the like, through a GUI of the PID, and have this number automatically dialed by the telephone. In this manner, the user's PID seamlessly interacts with the user's telephone to dial numbers and establish phone calls without requiring the user to access controls of the telephone. The wireless communication between the PID and the telephone can be compatible with a version of the Bluetooth specification. The wireless communication between the PID and the telephone can also be compatible with a version of the IrDA specification.

16 Claims, 9 Drawing Sheets

METHOD AND SYSTEM FOR WIRELESSLY AUTODIALING A TELEPHONE NUMBER FROM A RECORD STORED ON A PERSONAL INFORMATION DEVICE

TECHNICAL FIELD

The present invention relates to a system and method by which a personal information device ("PID") may directly control the operation functions of a mobile telephone.

BACKGROUND ART

Personal Information Devices include the class of computers, personal digital assistants and electronic organizers that tend both to be physically smaller than conventional computers and to have more limited hardware and data processing capabilities. PIDs include, for example, products sold by Palm, Inc. of Santa Clara, Calif., under such trademark as Pilot, and Pilot 1000, Pilot 5000, PalmPilot, PalmPilot Personal, PalmPilot Professional, Palm, and Palm III, Palm V, Palm VII, as well as other products sold under such trade names as WorkPad, Franklin Quest, and Franklin Convey.

PIDs are generally discussed, for example, in U.S. Pat. Nos. 5,125,0398; 5,727,202; 5,832,489; 5,884,323; 5,889,888; 5,900,875; 6,000,000; 6,006,274; and 6,034,686, which are incorporated herein by reference. PIDs typically include a screen and data processor, allowing the PID user to operate a substantial variety of applications relating to, for example: electronic mail, a calendar, appointments, contact data (such as address and telephone numbers), notebook records, expense reports, to do lists, or games. PIDs also often include substantial electronic memory for storing such applications as well as data entered by the user. Due to their substantial variety of applications and uses, personal information devices are becoming increasingly widely used.

Another widely used handheld digital device is the cellular telephone, or simply referred to as the cellphone. Cellphones are portable handheld devices that share a number of attributes of the PIDs. Cellphones, of course, include microphones and speakers with which to receive and send sound signals, typically the user's voices on either end of a connection. When in association with a modem or other such devices, the cellphone also may send and receive data signals, (including audio data signals). Many cellphones often include a screen in which to display information. However, cellphones typically have, or can accommodate, substantially fewer applications than many PIDs and user's find them much more difficult to use entering data, such as names and phone numbers, than PIDs. Further, some cellphones have less available memory for storing data signals than of many PIDs.

Because of this more limited functionality, cellphones are typically used for communication as opposed to personal information management (e.g., maintaining and updating appointments, contact lists, addresses, telephone numbers, and the like). Although many modern cellphones include computer resources to run some form of contact or telephone number lists, most users manage such information using other resources, such as, for example, a PID, and access cellphone (e.g., dial the correct number) once the proper telephone number is obtained.

There is a problem with this approach in that telephone numbers can be rather lengthy to dial, especially considering the small keypads on some cellphones. If the user makes a mistake while dialing, but doesn't notice the mistake untill the call goes through, the user must typically terminate the call (e.g., hang up) and start all over again. In addition, the user must devote attention to devices, for example, obtaining the correct telephone number from a PID and then correctly punching in the number on the keypad of the cellphone. One prior art solution to this problem involves the use an automatic audible-tone dialer in conjunction with the cellphone. However, audible-tone dialers have met with only limited success in the marketplace and do not work on all cellphones.

Accordingly, what is required is a method whereby a user's handheld PID can automatically dial a telephone number stored in its memory. What is required is a solution that allows applications executed on the user's PID, such as, for example, an address book program, to access the user's telephone and automatically dial members stored in the program. What is further required is a solution which enables a user's PID to seamlessly interact with the user's telephone to dial members and establish phone calls without requiring the user to access controls of the telephone. The present invention provides a novel solution to the above requirements.

SUMMARY OF THE INVENTION

The present invention provides a method whereby a user's handheld PID can automatically dial a telephone number stored in its memory. The present invention provides a solution that allows applications executed on the user's PID, such as, for example, an address book program, to access the user's telephone and automatically dial members stored in the program. The present invention further provides a solution which enables a user's PID to seamlessly interact with the user's telephone to dial members and establish phone calls without requiring the user to access controls of the telephone.

In one embodiment, the present invention is implemented as an automated telephone dialing system. The system enables a handheld PID to automatically dial a telephone number stored its memory by interacting with a telephone. The telephone (e.g., a handheld cellular telephone) is equipped with a wireless port for short range wireless data transfer. Similarly, the PID is equipped with a wireless port for short range wireless data transfer. The PID establishes a wireless communication with the telephone. The PID is configured to control the telephone via the wireless communications such that the telephone dials a telephone number stored on the PID. The telephone number can be dialed in response to the user interacting with an application executing on the PID. The application can be a contact management or address management program. The user can interact with the program, select a contact, address, phone number, or the like, through a GUI of the PID, and have this number automatically dialed by the telephone.

In this manner, the user's PID seamlessly interacts with the user's telephone to dial numbers and establish phone calls without requiring the user to access controls of the telephone. The wireless communication between the PID and the telephone can be compatible with a version of the Bluetooth specification. The wireless communication between the PID and the telephone can also be compatible with a version of the IrDA specification.

BRIEF DESCRIPTION OF THE DRAWINGS

The present invention is illustrated by way of example and not by way of limitation in the figures of the accompanying drawings, in which like reference numerals refer to similar elements, and in which.

DETAILED DESCRIPTION OF THE INVENTION

Figure 1:
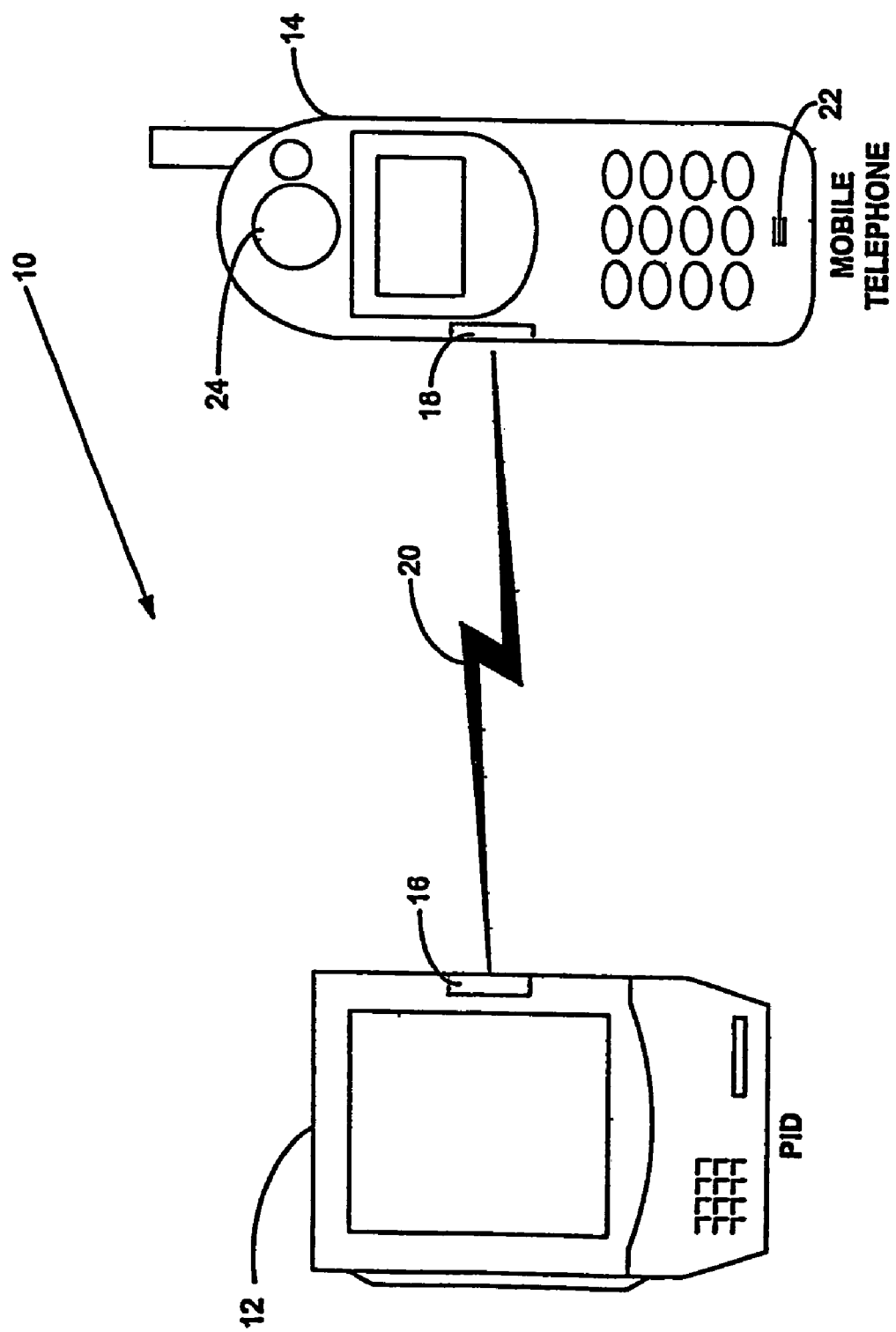
FIG. 1 is a diagram illustrating an exemplary preferred embodiment of the present system.

In the following detailed description of the present invention, a method and system for wirelessly autodialing a telephone number from a record stored on a personal information device, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

Some portions of the detailed descriptions which follow are presented in terms of procedures, logic blocks, processing, and other symbolic representations of operations on data bits within a computer memory. These descriptions and representations are the means used by those skilled in the data processing arts to convey most effectively the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "communicating" or "implementing," "trans-ferring," "executing," "controlling," "configuring," "storing," "initializing," or the like, refer to the actions and processes of an embedded computer system, or similar embedded electronic computing device, that manipulates and transforms data represented as physical (electronic) quantities within the computer system's registers and memories into other data similarly represented as physical quantities within the computer system memories or registers or other such information storage, transmission or display devices.

The present invention is directed towards a method whereby a user's handheld PID can automatically dial a telephone number stored in its memory. The present invention provides a solution that allows applications executed on the user's PID, such as, for example, an address book program, to access the user's telephone and automatically dial members stored in the program. The present invention further provides a solution which enables a user's PID to seamlessly interact with the user's telephone to dial members and establish phone calls without requiring the user to access controls of the telephone. Embodiments of the present invention and its benefits are further described below.

FIG. 1 shows an exemplary embodiment of a system 10 in accordance with one embodiment of the present invention. The system 10 includes a hand-held PID 12 and a mobile telephone 14. In one exemplary embodiment, the mobile telephone 14 is a hand-held cellular telephone.

As described above, the preferred embodiment utilizes a PID communicatively coupled to a mobile telephone. However, many electric devices, such as digital cameras, pagers, limited capability laptop computers, and the like, are similar to many PIDs in that they are unaware of the scheduling information contained within a user personal information device. Such limited-feature devices may also be enhanced by coupling the devices with a personal information device in accordance with present invention to implement the functionality for automatically updating the operating modes of the devices.

As shown in FIG. 1, the PID 12 of the present system 10 includes a wireless port, or transceiver, 16 (used herein to mean some combination of a receiver and/or transmitter). The telephone 14 has a corresponding wireless port, or transceiver, 18 such that a wireless link 20 is established between the telephone 14 and PID 12. The telephone 14 further includes a microphone 22 and speaker 24.

In one preferred embodiment, the wireless ports 16, 18 each include a short-range radio frequency ("RF") transceiver. The wireless transceiver 16, 18 establish an RF link, such as that defined by the Bluetooth communications specification. However, the link 20 can also take other forms, including an infrared communication link such as that as defined by the Infrared Data Association (IrDA).

Figure 2:
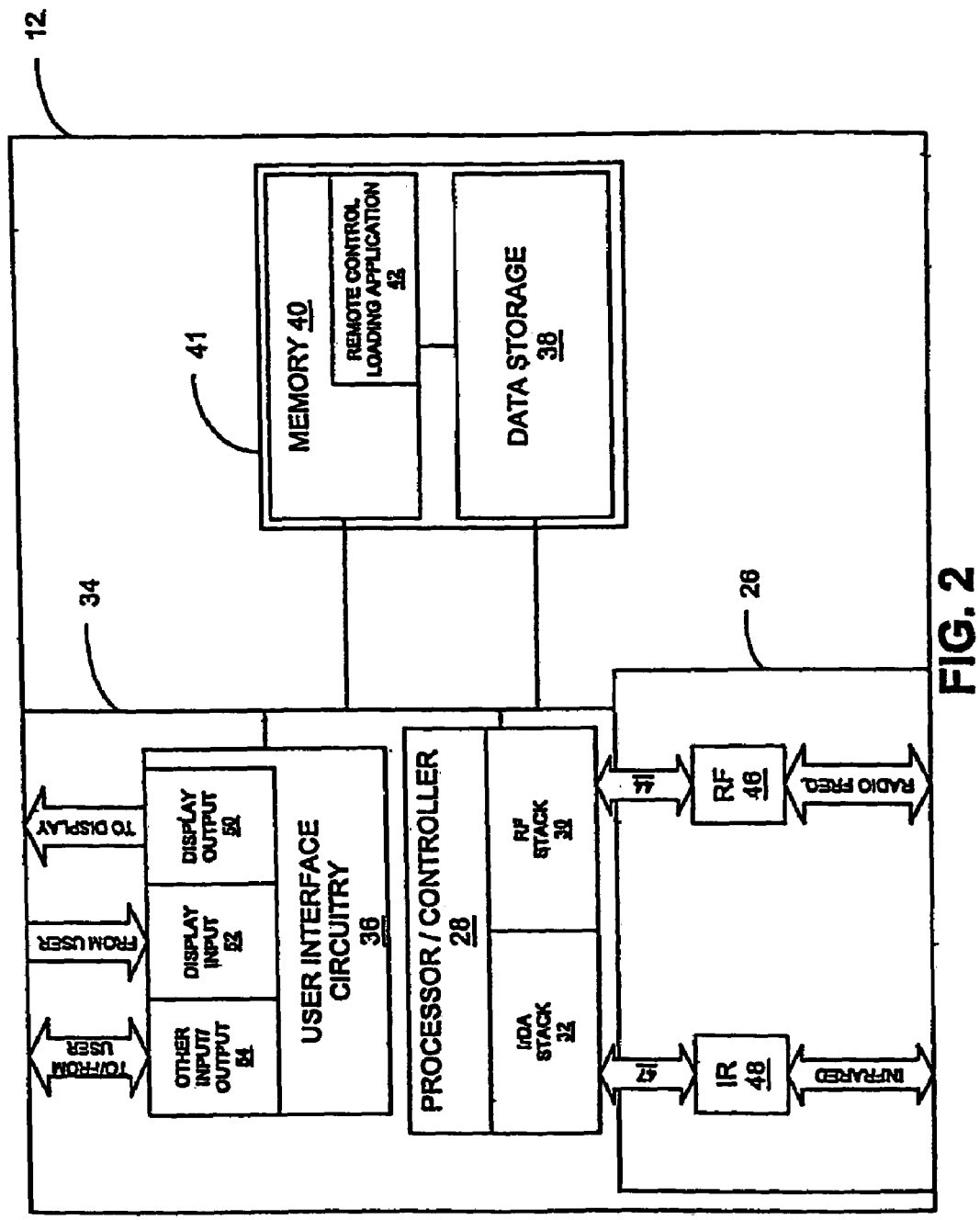
FIG. 2 is a block diagram illustrating the layers of a radio frequency protocol stack used in the PID of FIG. 2.

FIG. 2 is a function block diagram showing an exemplary embodiment of the PID 12 that can communicate with the telephone 14 or other such devices. The link interface circuitry 26 illustrates, but is not limited to, two alternative link interfaces for establishing a wireless link to another device. One wireless link interface (or more than two link interfaces) may, of course, be used with the present system 10.

The PID 10 includes a processor, or controller, 28 that is capable of executing an RF stack 30 and an IrDA stack 32. The stacks 30, 32 communicate with data interface circuitry 26 through a bus 34. The processor 28 is also connected through the bus 34 to user interface circuitry 36, a data storage module 38 and memory 40. As used herein, the data storage module 38 and memory 40 may both generally be referred to as part of the PID memory 41.

The memory 40 may contain a specific remote control loading application 42. The remote control loading application 42 may operate, for example, after the processor 28 receives a message for the user to establish a wireless link with the telephone 14 in the nearby environment. Alternatively, the remote control loading application 42 may operate in a PID default mode.

The data interface circuitry 26 includes, in this exemplary embodiment, a first and second port, such as, infrared and RF interface ports. The first wireless link interface, the RF link interface, may include first connection 44 which includes radio-frequency (RF) circuitry 46 for converting signals into radio-frequency output and for accepting radio-frequency input. The RF circuitry 46 can send and receive RF data communications via a transceiver that is part of the communication port 16. The RF communication signals received by the RF circuitry 46 are converted to electrical signals and relayed to the RF stack 30 in processor 28 via the bus 34.

The mobile telephone 14 includes a corresponding port, or transceiver, 18 for RF signals. Thus, the RF 24 and wireless link 20 between the PID 12 and telephone 14 may be implemented according to the Bluetooth specification, described at www.bluetooth.com, which is incorporated in its entirety into this document.

Bluetooth is the name for a short-range radio link intended to replace the cable(s) connecting portable and/or fixed electronic devices. Bluetooth technology features low power, robustness, low complexity and low cost. It operates in the 2.4 Ghz unlicensed ISM (Industrial, Scientific and Medical) band. Devices equipped with Bluetooth are capable of exchanging data at speeds up to 720 kbps at ranges up to 10 meters. It should be noted that higher power devices other than the typical Bluetooth enabled personal information device, such as, for example, a network access point, may communicate via Bluetooth with an RF-enabled PID over a greater range, such as, for example, approximately 100 meters.

A frequency hop transceiver is used to combat interface and fading. A shaped, binary FM modulation is applied to minimize transceiver complexity. A slotted channel is applied with a nominal slot length of 625 μs. For full duplex transmission, a Time Division Duplex scheme is used. On the channel, information is exchanged through packets. Each packet is transmitted in a different hop frequency. A packet nominally covers a single slot, but can be extended to cover up to five slots.

The Bluetooth protocol uses a combination of circuit and packet switching. Slots can be reserved for synchronous packets. Bluetooth can support an asynchronous data channel, up to three simultaneous voice channels, or a channel that simultaneously supports asynchronous data and synchronous voice. Each voice channel supports a 64 kb/s synchronous (voice) channel in each direction. The asynchronous channel can support maximum 723.2 kb/s asynchronous, or 433.9 kb/s symmetric.

The Bluetooth system consists of a radio unit, a link control unit, and a support unit for link management and host terminal interface functions. The link controller carries out the baseboard protocol and other low-level routines.

The Bluetooth system also provides a point-to-point connection (only two Bluetooth units involved) or a point-to-multipoint connection. In the point-to-multipoint connection, the channel is shared among several Bluetooth units. Two or more units sharing the same channel form a piconet. One Bluetooth unit acts as the master of the piconet, whereas the other units act as slaves. Up to seven slaves can be active in a piconet.

The Bluetooth link controller has two major states: STANDBY and CONNECTION. In addition, there are seven substances: page, page scan, inquiry, inquiry scan, master response, slave response, and inquiry response. The substances are interim states that are used to add new slaves by piconet.

The STANDBY state is the default state in the Bluetooth unit. In this state, the Bluetooth unit is in a low-power mode. The controller may leave the STANDBY state to scan for page or inquiry messages, or to page or inquiry itself When responding to a page message, the unit enters the CONNECTION state as a master.

In order to establish new connections, the inquiry procedures and paging are used. The inquiry procedures enable a unit to discover which units are in range, and what their device address and clocks are during an inquiry substrate. The discovering unit collects the Bluetooth device addresses and clocks of all units that respond to the inquiry message. It can then, if desired, make a connection to any one of them. The inquiry message broadcasted by the source does not contain any information about the source. However, it may indicate which class of devices should respond.

There is one general inquiry access code (GIAC) to inquire for any Bluetooth device, and a number of dedicated inquiry access codes (DIAC) that only inquire for a certain type of devices. A unit that wants to discover other Bluetooth units enters an inquiry substance. In this substance, it continuously transmits the inquiry message (which is an identification packet) at different hop frequencies. A unit that allows itself to be discovered, regularly enters the inquiry scan substance to respond to inquiry messages.

As noted above, the system 10 may operate with only one wireless link. However, additional, or alternative, wireless link interfaces may also be included in the system 10. A second connection 46 includes infrared circuitry 48 for converting signals into infrared output and for accepting infrared input. Thus, the wireless link 28 may include an infrared interface. The infrared circuitry 48 can send and receive infrared data communications via the port, or transceiver, 16.

Infrared communication signals received by infrared circuitry 48 are converted into electrical signals that are relayed to the IrDA stack 32 in the processor, or controller, 28 via the bus 34. The telephone 14 may include a corresponding infrared transceiver. The infrared circuitry 48 operates according to the IrDA specifications available at www.IrDA.org.

The two, alternative link interfaces described above are merely exemplary, and additional means for implementing the interface between a PID and telephone or other such device may also be utilized. Although not required, more than one wireless link interface may be included to improve flexibility and to provide redundancy in case of failure of one of the link interfaces.

User interface circuitry 36 in the PID 12 includes hardware and software components that provide user input and output resources for functions in the processor 28. The user interface circuitry 36 includes display output 50, display input 52, and additional input/output interface circuitry 54.

The display output 50 preferably receives digital information representing graphical data from the processor 28 and converts the information to a graphical display, such as text and or/images, for display on a display screen. The display input 52 may receive data inputs, such as graphical data inputs, from a user of the PID 12. The graphical data inputs are preferably entered by the user with a stylus on a pressure sensitive display screen, and may include text, drawings, or other objects that are capable of being graphically presented.

Typically, the additional input/output interface 54 permits user input and commands to be input through buttons and similar devices on the PID, e.g., buttons for scrolling through data entries and activating applications. Alternatively, the input/output interface 54 may allow the PID 12 to accept audio data as well as other types of non-graphical data. For example, audio data signals (or picture telephone video input) may be entered through the additional input/output interface 54.

Figure 3:
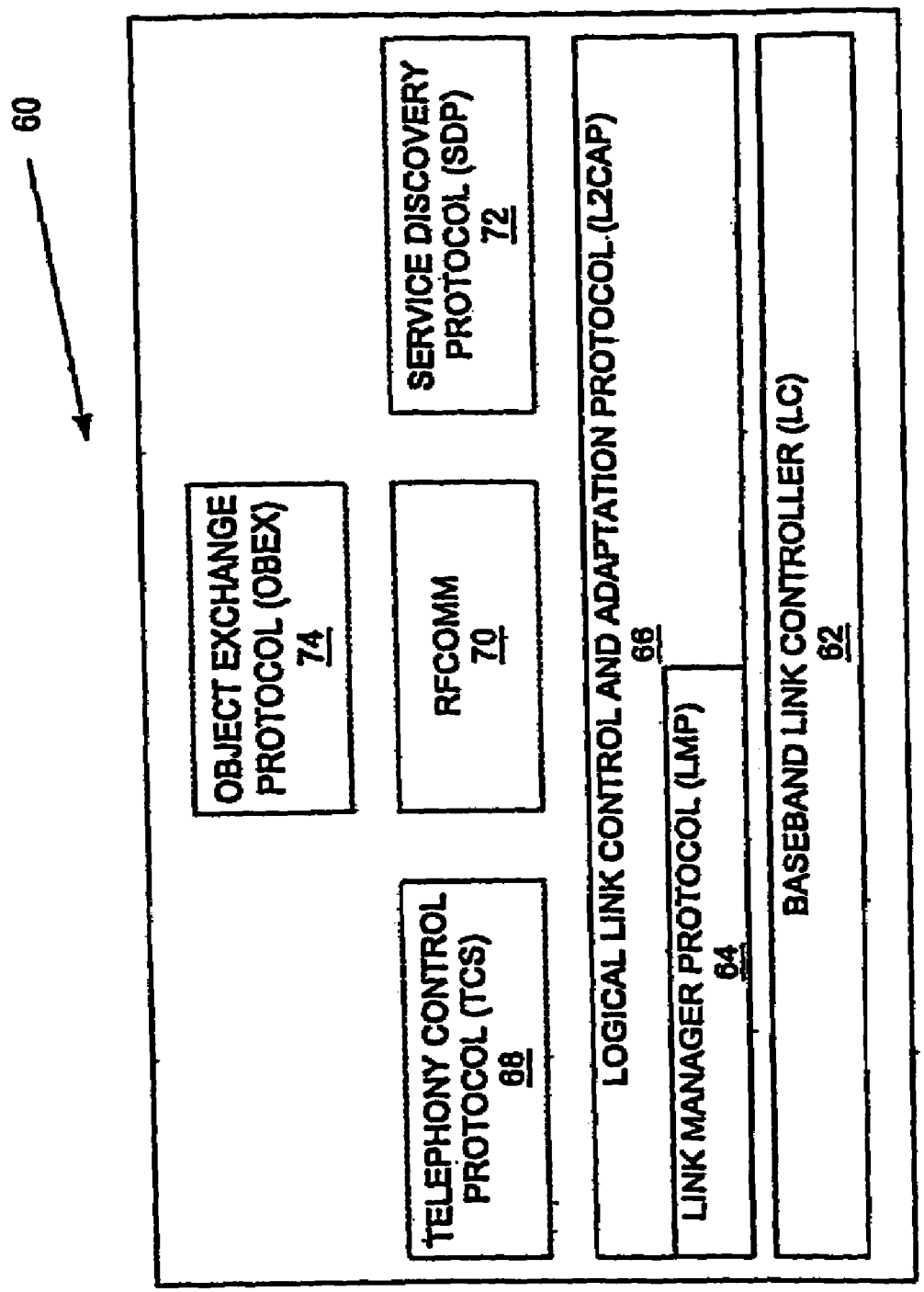
FIG. 3 shows a stack layer diagram illustrating the layers of an RF protocol stack in accordance with one embodiment of the present invention.

FIG. 3 shows a diagram illustrating the layers of the Bluetooth (RF) protocol stack 60 in accordance with one embodiment of the present invention. An RF protocol stack is implemented at each end of the connection endpoints of an RF link. For example, a PID 12 and a telephone 14 could each implement an RF stack to enable a link. The required layers of the RF link using the Bluetooth system are the Baseband layer 62, the Link Manager Protocol Layer (LMP) 64, the Logical Link Control and Adaptation Layer 68, RFCOMM Layer 70, Service Discovery Protocol Layer 72, and Object Exchange Protocol (OBEX) layer 74.

Figure 4:
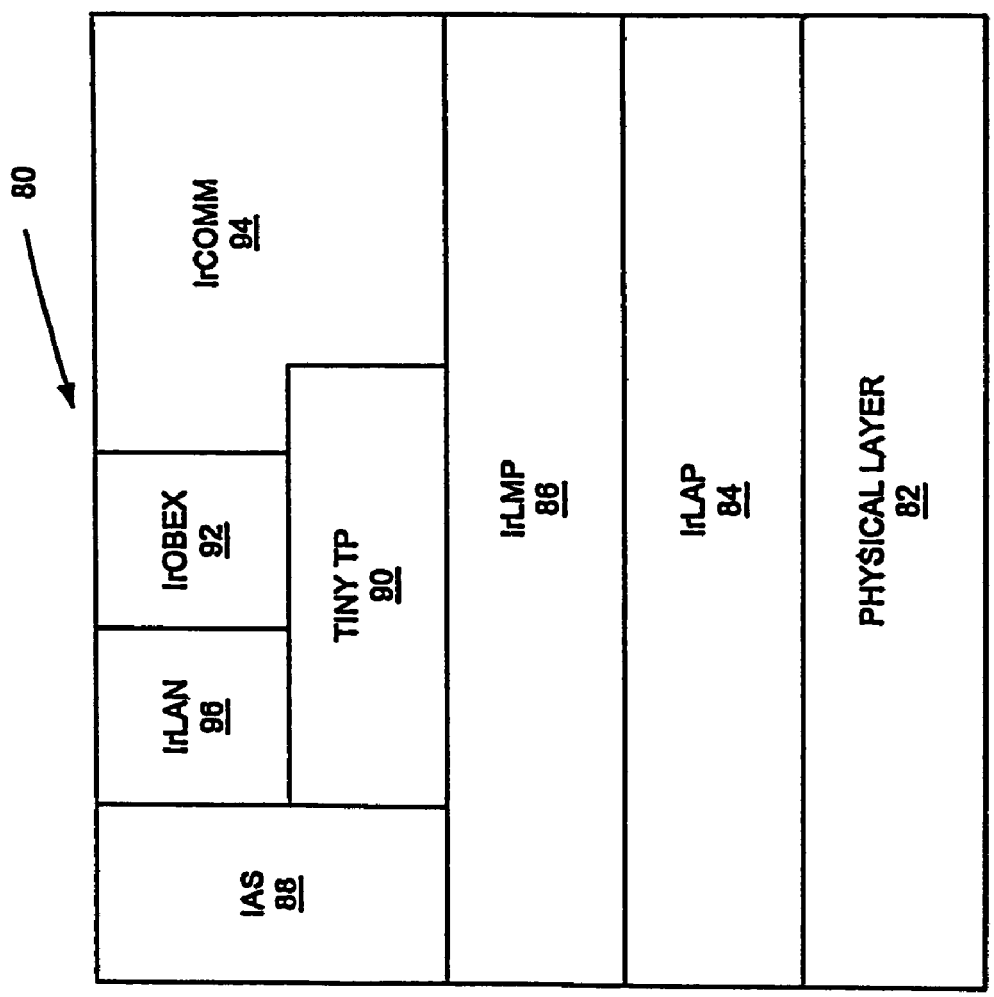
FIG. 4 is a stack layer diagram illustrating layers of an Infrared Data Association protocol stack used in the PID of FIG. 2.

FIG. 4 is a protocol diagram 80, illustrating the layers of the IrDA protocol stack that may be used with the system 10. For example, the PID and the telephone 41 each implement an IrDA protocol stack to enable the wireless link 20.

The required layers of an IrDA protocol stack are the physical layer 82, the IrLMP layer 84, the IrLMP layer 86 and the IAS layer 88. The physical layer 82 specifies optical characteristics of the link, encoding of the data, and framing for various speeds. The IrLAP (Link Access Protocol) layer 84 establishes the basic reliable connection between the two ends of the link. The IrLMP (Link Management Protocol) layer 86 multiplexes services and applications on the IrLAP connection. The IAS (Information Access Service) layer 88 provides a directory of services on an IrDA device.

The IrDA protocol also specifies a number of optional protocol layers, these protocol layers being TINY TP90, IrOBEX 92, IrCOMM 94 AND IrLAN 96. TINY TP (Tiny Transport Protocol) 90 adds per-channel flow control to keep traffic over the link 20 moving smoothly. IrOBEX (Infrared Object Exchange Protocol) 92 provides for the easy transfer of files and other data objected between the IrDA devices at each end of the applications that use serial and parallel communications to use IrDA without change. IrLAN (Infrared Object Exchange Protocol) 92 provides for the easy transfer of files and other data objects between the IrDA devices at each end of the link 20. IrCOMM 94 is a serial and parallel communications to use IrDA without change. IrLAN (Infrared Local Area Networks) 96 enables walk-up infrared LAN access.

The use of the optional layers depends upon the particular application in the IrDA device. The IrDA protocol stack is defined by such standard documents as "IrDA Serial Infrared Physical Layer Link Specification", "IrDA 'IrCOMM': Serial and Parallel Port Emulation over IR (wire replacement)", "IrDA Serial Infrared Link Access Protocol (IrLAP)", "IrDA Infrared Link Management Protocol (IrLMP)", and "IrDA 'TINY TP': A Flow-Control Mechanism for use with IrLMP,: and related specifications published by the IrDA. Such documents are available at www.irda.org/standards/specifications.asp and are incorporated in their entirety in this document.

Figure 5:
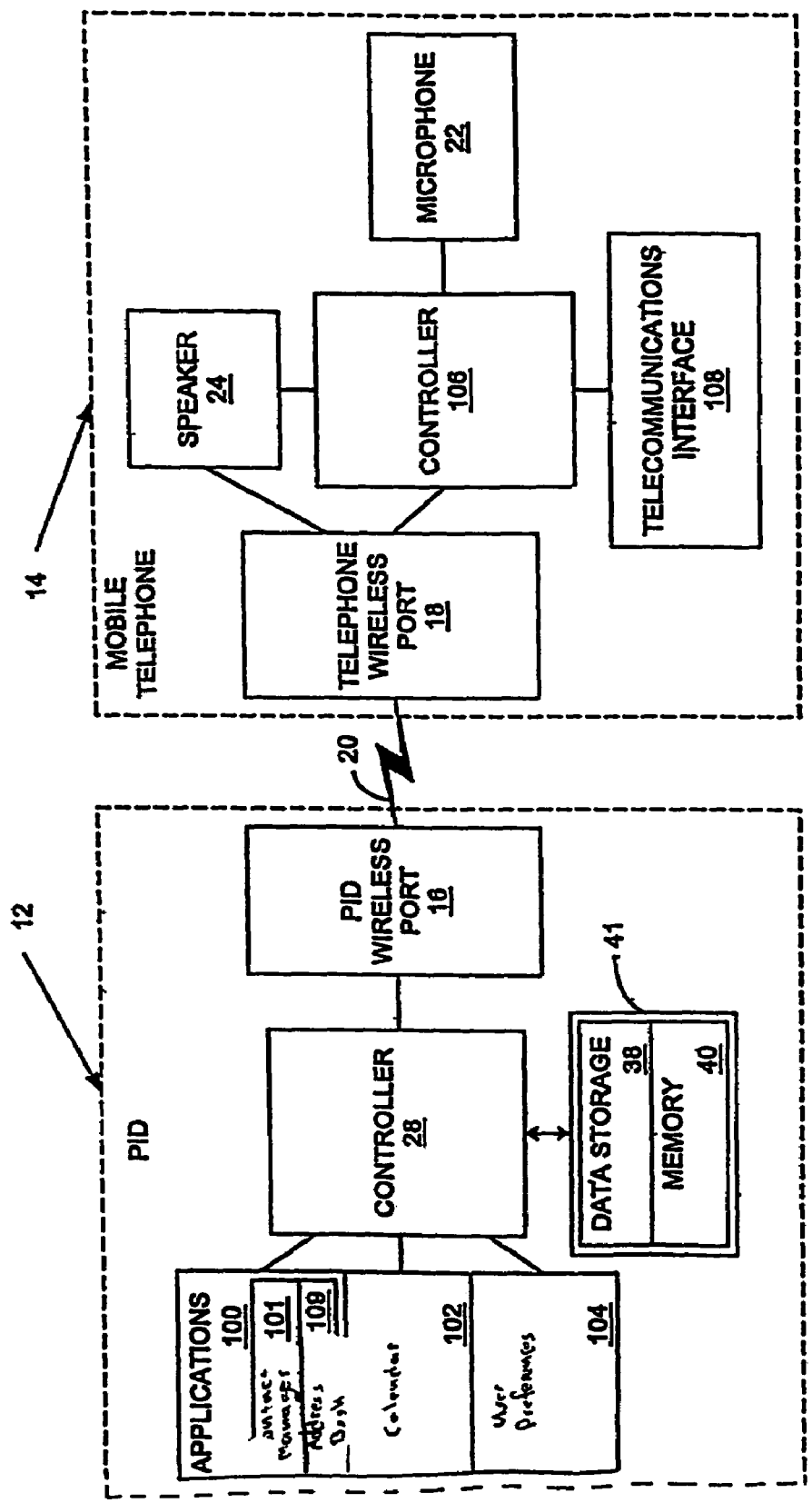
FIG. 5 is a block diagram of the system of FIG. 1.

As shown in FIG. 5, the PID 12 may include resident applications 100, such as, for example, a contact management program 101 for managing contact information. The PID 12 may include as well, for example, an address book program 109 for managing address and telephone number information, a calendar program 102 for assisting in managing scheduling and events, and a user preferences program 104 for configuring personal information device 12 in accordance with the requirements of the user.

As described above, PID 12 can accept input from a user, such as selecting a specific contact using contact management program 101, and automatically dial a telephone number stored in its memory via a wireless communication with telephone 14. The wireless link 20 enables applications executed on PID 12 (e.g., address book program 109) to access the telephone 14 and automatically dial the number stored in the application (e.g., within memory 40). The wireless link 20 enables an application executing on PID 12 to access telephone 14, communicate the desired telephone number, and control telephone 14 to dial the number and established the telephone call. In the present embodiment, the interactions are seamless, wherein the telephone 14 is controlled by PID 12 without requiring any intervening steps or actions by the user with any controls of telephone 14 (e.g., punching any keys on a keypad). The user can interact with the program (e.g., address book program 109), select a person, or the like, through the program's GUI, and have this number automatically dialed by the telephone 14. The wireless communication link 20 between the PID 12 and the telephone 14 can be an RF based Bluetooth link or and IR based IrDA link.

Referring now to FIG. 6A through FIG. 6D, a user interaction process with the GUI of an application in accordance with one embodiment of the present invention is shown. FIGS. 6A–6D depict an example process through which a user has a telephone number stored within, for example, address book program 109 in PID 12 that will be automatically dialed by telephone 14.

Figure 6A:
FIG. 6A shows a diagram of a first GUI dialog box in accordance with one embodiment of the present invention.
Figure 6B:
FIG. 6B shows a second GUI dialog box in accordance with one embodiment of the present invention.
Figure 6C:
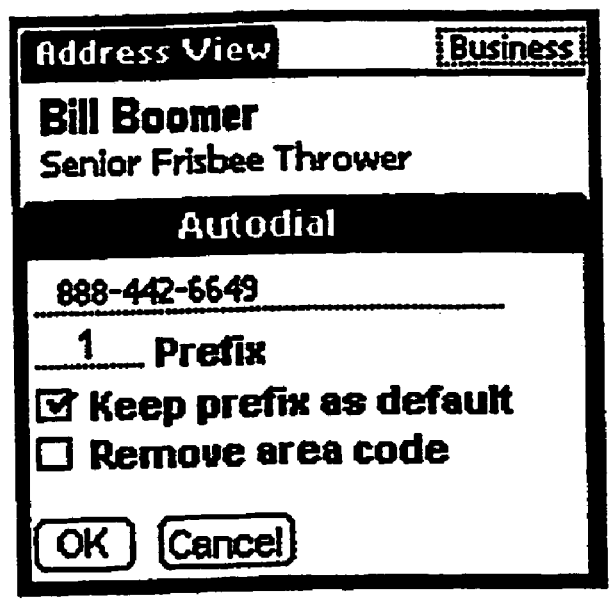
FIG. 6C shows a third GUI dialog box in accordance with one embodiment of the present invention.
Figure 6D:
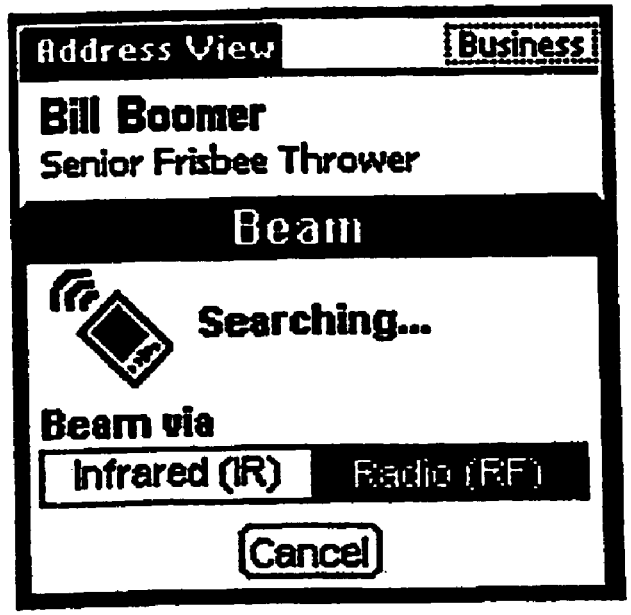
FIG. 6D shows a fourth GUI dialog box in accordance with one embodiment of the present invention.

FIG. 6A shows an address list as presented by address book program 109 on PID 12. For example, address book 109 executes a "lookup" feature to call up contact information for various people/organizations stored within memory. The user can then select the person/organization to place a call to. In this example, the user has selected "Bill Boomer" by, for example, tapping on the entry with a stylus. In response to the selection, address book program 109 then presents information associated with the selection made in FIG. 6A. The user can then confirm the correct selection is presented in the GUI, and then select the appropriate button for the specific telephone number to dial (e.g., work, home, fax, or pager). Then, as shown in FIG. 6C, the user can once again the confirm the correct number is presented in the GUI, and select "OK" to initiate the automatic dialing process. If the number shown is incorrect, the user can modify the prefix by, for example, removing or altering the area code, or correcting any of the other digits of the number, or cancel the entire process. Subsequently, as shown in FIG. 6D, the automatic dialing process begins, with PID 12 setting up a communications link with telephone 14 for the execution of the autodial. The communication can be IR based or RF based, depending upon the last such communication, previous selection, default setting, etc.

Figure 7:
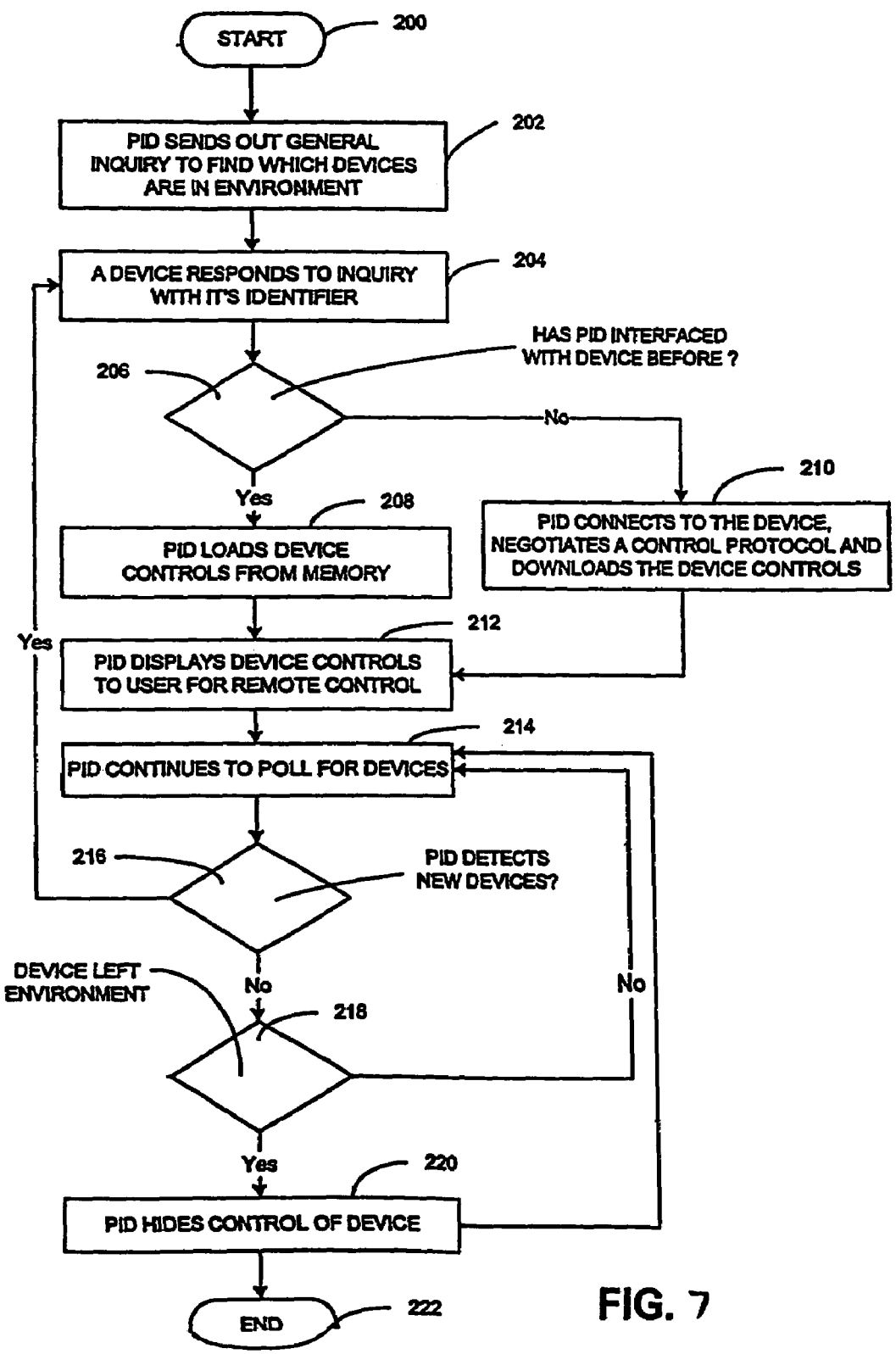
FIG. 7 is a flowchart illustrating on exemplary method for a PID in accordance with one embodiment of the present invention to establish a wireless link.

FIG. 7 illustrates a process by which the PID 12 detects and communicates with another device, such as the telephone 14 that is in its environment (or other additional mobile computing devices within range) using standard RF protocols (e.g., Bluetooth). The process begins at Step 200 when either the user manually initiates the process or the process is implemented as a default. At step 202, the PID 12 sends out a general query to determine whether a corresponding telephone is present in the nearby environment (for example, in the room). According to Bluetooth terminology, this step is analogous to the process of discovery.

At Step 204, the telephone 14 responds to the query with its unique identifier using, but not limited to, the discovery resins protocol defined by the Bluetooth specification. The PID 12 then loads the controls of each device using at least two methods. If it is determined at Step 206 that the PID 12 has interfaces with the telephone 14 before and the controls had previously been downloaded, then, at step 208, the PID 12 accesses the controls from its memory. However, if it is determined at Step 206 that the PID 12 has not interfaced with the telephone 14 before, then, at Step 201, the PID 12 connects with the telephone 14 and negotiates a control protocol. As an alternative, the PID 12 may be manufactured with pre-stored controls for certain devices. These controls may be accessed whenever the PID 12 detects the respective devices or class of devices.

At Step 212, the PID 12 presents a notification to the user, indicating that the link between the PID 12 and telephone 14 has been established. The PID 12 then continues to poll for devices at regular time intervals, as set out in Step 214, querying the environment to determine if any devices, like the telephone 14, have appeared or any such devices have left the PID environment. If the PID 12 detects a new device in its environment at Step 218, the PID 12 hides the controls for the telephone 14 from the user and transfers the controls to a storage location, such as the memory 40 or data storage module 38 (Step 220).

If the telephone 14 is still in the PID's environment, as determined at step 218, then the process returns to Step 214 and continues. The process ends at Step 222 if the user disables the remote control loading applications. However, if the user does not disable the application, then the process returns to Step 214 and follows the process again.

Figure 8:
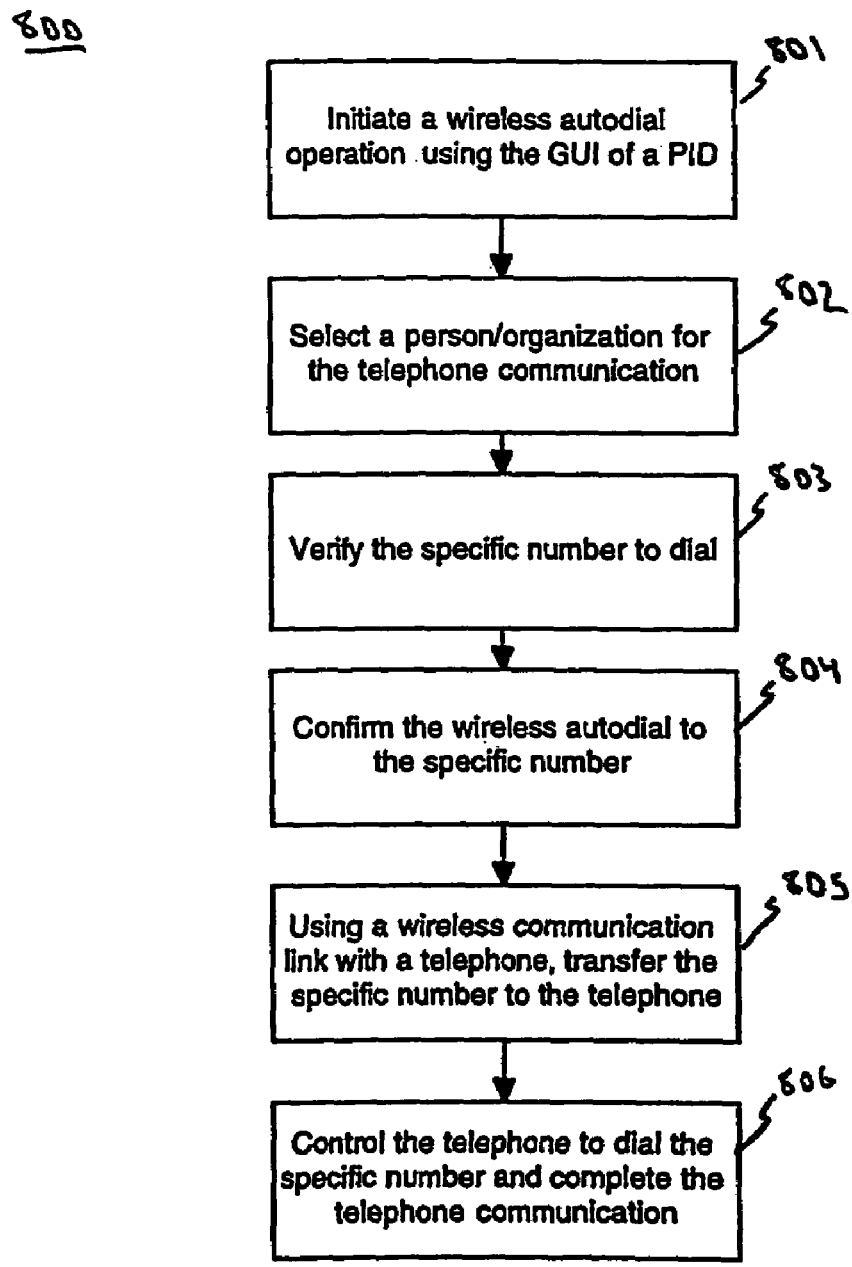
FIG. 8 is a flowchart illustrating the steps of an automatic wireless dialing process in accordance with one embodiment of the present invention.

FIG. 8 shows a flowchart of the steps of the wireless autodialing process 800 in accordance with one embodiment of the present invention. Process 800 shows the operating steps of the autodial process after a wireless link (e.g., wireless link 20) has been established between the PID (e.g., PID 12) and the telephone (e.g., telephone 14) as described in FIG. 7.

Process 800 begins in step 801, where the user initiates a wireless autodial operation using the GUI of PID 12. As described above, the user can access a large amount of information stored and maintained within the memory of PID 12. The information is maintained by one or more applications resident within PID 12, such as address book program 109 and contact manager program 101. Upon initiation, the particular program can present a list of individuals/organizations from which the user can select the desired individual/organization to contact. In step 802, from the list, the user selects the desired contact, for example, as depicted in FIGS. 6A and 6B above. In step 803, after selection of the desired contact, the user verifies the specific number to dial (e.g., as shown in FIG. 6C).

Referring still to FIG. 8, in step 804, the user confirms the wireless autodial to the specific number, for example, as shown in FIG. 6D. In step 805, using a wireless communication link (e.g., link 20 of FIG. 5) with the telephone 14, the PID 12 transfers the specific number to telephone 14. Subsequently, in step 806, PID 12 controls telephone 14 to dial the specific number and complete the telephone communication.

Thus, the present invention provides a method whereby a user's handheld PID can automatically instruct a cellphone to dial a telephone number stored in the PID's memory. The present invention provides a solution that allows applications executed on the user's PID, such as, for example, an address book program, to access the user's telephone and automatically dial members stored in the program. The present invention further provides a solution which enables a user's PID to seamlessly interact with the user's telephone to dial members and establish phone calls without requiring the user to access controls of the telephone.

It should be noted that the programs, processes, methods and systems described herein are not related or limited to any particular type of computer or network system (hardware or software), unless indicated otherwise. In view of the variety of embodiments to which the principles of the present invention can be applied, it should also be understood that the illustrated embodiments are exemplary only and should not be taken as limiting the scope of the present invention.

For example, the steps of the flow diagrams may be taken in sequences other than those described, and more or fewer elements may be used in the block diagrams. In addition, protocols of various types are referenced throughout. While preferred and alternate embodiments may implement selected protocols, any suitable replacement protocol not mentioned, or any function not part of a protocol used to replace a corresponding function from a protocol, may be implemented without departing from the scope of the invention. While various elements of the preferred embodiments have been described as being implemented in software, in other embodiments hardware or firmware implementations may alternatively be used, and vice-versa. Also, while the present invention has been described in the context of a mobile telephone in communication with a PID, the principles of the present invention may be applied to other combinations of devices, such as a PID in communication with a land-line telephone, without departing from the teachings of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. An automated telephone dialing system, comprising:
   a telephone having a wireless port for short range wireless data transfer; and
   a handheld computer system having a wireless port for communication with the wireless port on the telephone, wherein a specific telephone number is selectable from a list displayed on the handheld computer system and wherein the handheld computer system is operable to transfer the specific telephone number to the telephone using a wireless communication, and wherein the handheld computer system is configured to control the telephone via the wireless communication such that the telephone dials the specific telephone number.

2. The system of claim 1 wherein the dialing of the specific telephone number by the telephone is automatically effected in response to a user interacting with the information stored on the handheld computer system.

3. The system of claim 2 wherein the information stored in the handheld computer system includes contact information.

4. The system of claim 2 wherein the list is presented as a list of contacts and the telephone number dialed by the telephone corresponds to one of the contacts selected by the user.

5. The system of claim 2 wherein the information stored on the handheld computer system is maintained by a management program executing on the handheld computer system and the management program controls the telephone via the wireless communication.

6. The system of claim 5 wherein the management program is an address book program.

7. The system of claim 1 wherein the wireless communication is compatible with a version of the Bluetooth specification.

8. The system of claim 1 wherein the wireless communication is compatible with a version of the IrDA specification.

9. An automatic wireless telephone dialing method, comprising the steps of:
   a) establishing a wireless communications link for a short range data transfer between a telephone and a handheld computer system;
   b) receiving a user input identifying a specific telephone number from a list displayed on the handheld computer system;
   c) transferring the specific telephone number from the handheld computer system to the telephone using a wireless communication; and
   d) controlling the telephone using the handheld computer system to cause the telephone to dial the specific telephone number.

10. The method of claim 9 wherein step d) further includes the step of dialing the specific telephone number automatically in response to a user interacting with the information stored on the handheld computer system.

11. The method of claim 10 wherein the information stored in the handheld computer system includes contact information.

12. The method of claim 10 wherein the list is presented as a list of contacts and the telephone number dialed by the telephone corresponds to one of the contacts selected by the user.

13. The method of claim 10 wherein the information stored on the handheld computer system is maintained by a management program executing on the handheld computer system and the management program controls the telephone via the wireless communication.

14. The method of claim 13 wherein the management program is an address book program.

15. The method of claim 9 wherein the wireless communication is compatible with a version of the Bluetooth specification.

16. The method of claim 9 wherein the wireless communication is compatible with a version of the IrDA specification.

* * * * *